Oct. 3, 1933.    H. V. SPERBECK    1,929,105
AUTOMATIC PHOTO PRINTING APPARATUS
Filed March 29, 1932
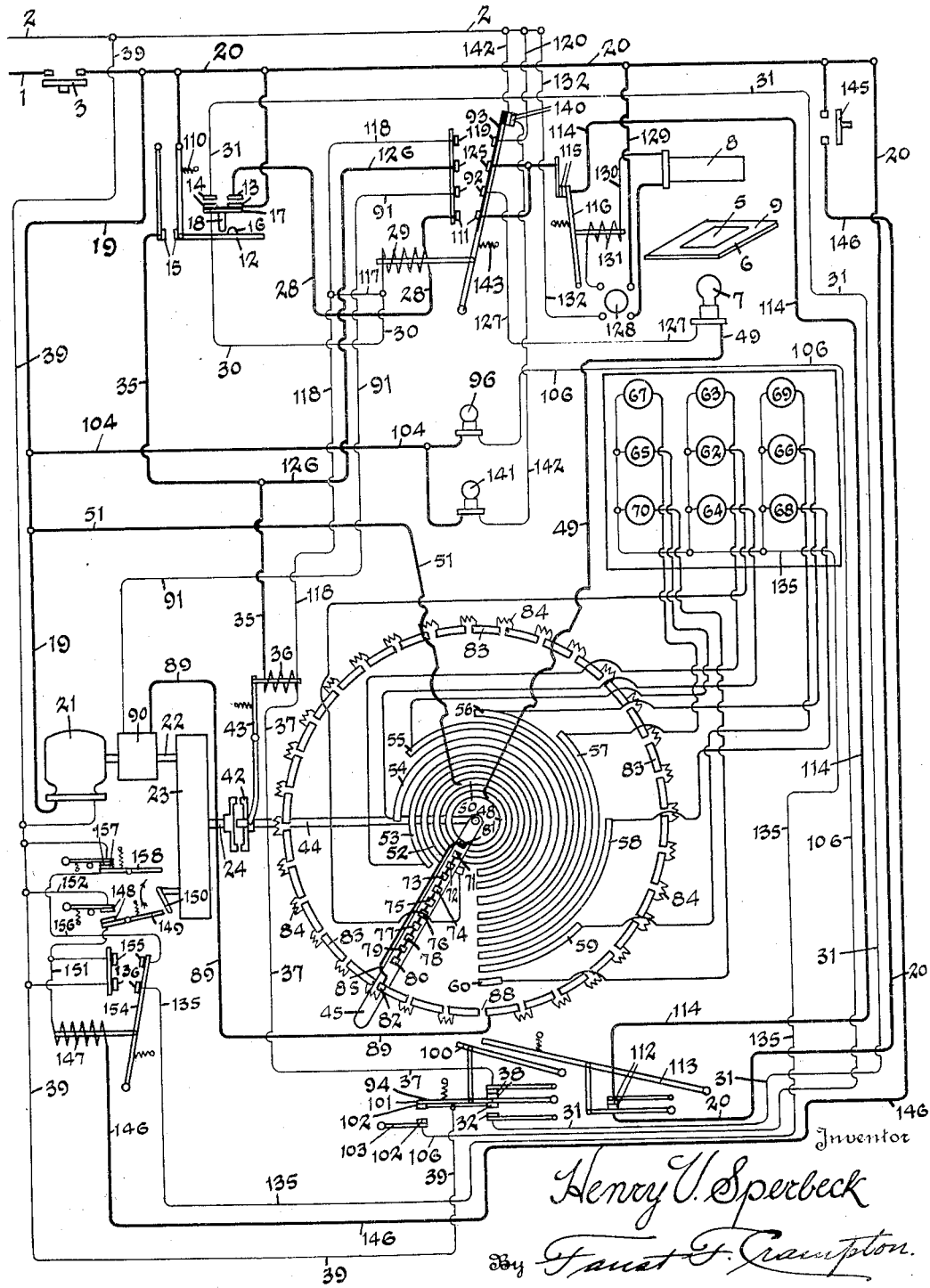
Inventor
Henry V. Sperbeck
By Faust F. Crampton.
Attorney Patented Oct. 3, 1933

1,929,105

UNITED STATES PATENT OFFICE 1,929,105

AUTOMATIC PHOTO PRINTING APPARATUS

Henry V. Sperbeck, Ann Arbor, Mich.

Application March 29, 1932. Serial No. 601,873

2 Claims. (Cl. 95—73)

My invention has for its object to provide a photo printing apparatus that will automatically set connections of photo printing lamps according to the average transparency of the negative to produce exposure period of substantially uniform length. The exposed positive and negative are subjected to a light intensity that is determined by the light transmitted through the negative. The apparaus is set for printing the positives by the light transmissibility of the negative.

The invention provides an apparatus for printing negatives by varying the intensity of the printing light according to a predetermined measured average of light transmissibility of the negative from which the prints are to be produced. The invention particularly provides an apparatus whereby a negative may be disposed intermediate a source of light and a photo cell and the current through the cell may be varied until its quantity is sufficient to produce a response of a predetermined character, the apparatus being set as the resistance through the photo cell is progressively reduced by increasing the light quantity directed against the photo cell and until the responsiveness of the photo cell takes place. When this occurs the apparatus has been adjusted to produce the required printing light intensity in subsequent operations of the apparatus. The apparatus also provides a means for establishing connection with one or more of a plurality of lamps that in number correspond to the resistance reduction to obtain the required current flow to a lamp that produces the required responsiveness of the photo cell by the effect of the light transmitted from the lamp through the negative to the photo cell. As the resistance is progressively reduced, connections are established progressively with a correspondingly increasing number of lamps which constitute the source of the photo printing light. The negative and the positive paper are then subjected to the light of the photo printing lamps. Thus, by my invention, prints of high quality and of uniform characteristics may be produced from different negatives. The invention enables a perfection in production of photographic prints.

Thus the invention provides a means for accurately measuring and determining the exposure period or the intensity of the light of exposure to produce accurate reproduction. The apparatus is so designed that adjustment may be made and consequently desired characteristics of all prints may be obtained and prints having a standardized perfection may be readily produced by different negatives without loss or waste of sensitized photo paper caused by improper exposure, etc.

The invention may be contained in apparatus of different forms. To illustrate a practical application of the invention, I have selected a system or apparatus embodying the invention and will describe the apparatus. The apparatus selected is shown in the accompanying drawing.

The figure illustrates diagrammatically the electrical connection between the parts of the apparatus that are shown conventionally.

The apparatus is electrically operated by an electric motor and is electrically controlled by electric switches that receive their supply of current from a suitable source, such as the main lines 1 and 2. The circuits of the apparatus are connected to the lines 1 and 2 by means of the switch 3.

When it is desired to print one or more positives from a negative, the apparatus is first set according to the transmissibility of the light through the negative. The switch 3 is closed and the negative 5 is placed on the surface of a ground glass plate 6 located intermediate a lamp 7 and a photo electric cell 8. These parts may be enclosed in a chamber in order to confine the light produced by the lamp 7 and to prevent the transmission of any light to the photo cell, except that which passes through the negative 5. The margin of the ground glass plate 6, as at 9, may be covered to prevent any transmission of any light therethrough. Thus the ground glass plate will form a partition in the chamber, the bulb 7 being located on one side and the photo electric cell 8 being located on the other side. The only light that will thus effect the photo electric cell 8 will pass through the negative 5.

In order to establish the connection of the source of supply with the lamp 7, the push button rod 12 is operated and when operated it closes the contacts 13 and 14 momentarily, and also the contacts 15. The push rod 12 is provided with a cam or cam part 16 that engages a projection 18 of a movable member 17 that operates to close the contacts 13 and 14 as the knob or cam part 16 is moved relative to the part 17. The contacts 13 and 14 are opened when the cam part 16 passes the projection 18 of the movable part 17. Likewise the contacts 13 and 14 are again closed on a return movement of the push rod 12.

When the switch 3 is closed, the motor 21 is connected with the source of supply through the lines 1 and 2. The shaft 22 of the motor is connected to a reducing gear conventionally illustrated as a gear box 23. The shaft 24, operating at a very much reduced speed by the shaft 22, provides a mechanical movement that is utilized in shifting a rotatable contact member that selectively connects the photo printing lamps in a circuit and in numbers that are dependent upon the extent of movement of the rotatable contact members. It controls the motor automatically to locate itself at a fixed starting point.

When the contacts 13 are closed, the line 20 is connected through the line 28 to the solenoid 29. The return from the solenoid 29 is through the line 30, the contacts 14, the line 31 to a contact 32 which, however, is open and in a return operation of the push rod 12 this circuit is completed, as hereinafter described. When the contacts 15 are closed, a circuit is established from the line 20, through the line 35, and the solenoid 36, the line 37, the contacts 38 to the line 39 which is connected to the main line 2. The solenoid 36 operates a clutch 42 through a lever 43 to connect the shaft 44 with the shaft 24. The motor 21 causes rotation of the shaft 44 during the time that the solenoid 36 is energized.

The shaft 44 is connected to a rotatable contact member 45. The rotatable contact member 45 moves over a plurality of circular contacts, some of which are annular in form and others of which are segmental. One of the annular contacts, namely the contact 48, is connected by the line 49 to the lamp 7. Another annular contact 50 is connected by a line 51 to the supply line 1 through the line 19. The segmental contacts 52 to 60 are connected to the photo printing lights 62 to 70, respectively, and the contact member 45 is provided with a contact 71 that connects with the annular contact 50 and the contacts 72 to 80 that connect with the segmental contacts 52 to 60, respectively, to which the photo printing lights 62 to 70 are connected, respectively. The rotatable contact member 45 is also provided with a contact 81 which connects with the lamp 7 through the line 49. The contact 81 is connected to the contact 82 that makes contact with the plurality of rheostat contacts 83. The contacts 83 are connected in series by a plurality of resistances 84 and the contacts 81 and 82 are connected by a wire 85 to connect the lamp 7 through the contact 48, the contact 81, the contact 82, with the rheostat formed by the contacts 83 and the resistance wires 84. Two of the contacts 83 are separated by a gap, as at 88, and one of the contacts 83, located on the following side of the gap with respect to the direction of rotation of the rotatable contact member 45 as produced by the shaft 44, is connected by a line 89 through a constant current generator 90. The return of the current through the generator is by the line 91 to the contact 92 of the switch 93 which, however, is open. The rotatable contact member 45, however, moves over the circularly arranged contacts until the rotatable contact member 45 depresses the switch 94 to establish a connection with a signal lamp 96. This provides the starting point of the current variation in the lamp 7, irrespective of the location of the rotatable contact member 45, when the clutch 42 is first actuated by the solenoid 36.

The end of the rotatable contact member 45 projects so as to engage the pivoted arm 100 which forms a part of the switch 94. The arm 100 is depressed which depresses the arm 101 which carries the contact 32 and the contact 102 which is connected to the contact 32 located on the arm 101. The contact 102 of the arm 101 closes with the contact 102 on the arm 103. A circuit is thus completed from the line 1 through the lines 19, 104, the signal lamp 96, line 106, the contacts 102, line 39 to the line 2. At the same time the circuit through the solenoid 36 is broken at the contacts 38 and the clutch 42 is opened which brings the rotatable contact member 45 to a stop. The finger is removed from the push rod 12 when the signal lamp 96 indicates that the rotatable contact arm 45 has been moved to its initial negative light measuring position. When the push rod 12 is released, it is moved outward by the tension spring 110 and the knob or cam 16 closes the contacts 13 and 14, which operates to close the circuit through the solenoid 29, the current passing through the line 28 from the main line 1. The current flows from the solenoid 29 through the lines 30 and 31, contacts 32 that are held closed by the rotatable contact member 45, and line 39 to line 2. Energization of the solenoid 29 closes the switch 93 and completes the circuit through contacts 111 which completes the circuit of the line 1 through the line 20 to the contacts 112 of the switch 113, line 114, through the contacts 115 of the switch 116, through the contacts 111 to the solenoid 29, through the lines 117 and 118, through the contacts 119 of the switch 93 and the line 120 to the line 2. This operates to maintain the energization of the solenoid 29 and consequently maintains the switch 93 closed, notwithstanding the opening of the contacts 13 and 14. When the switch 93 is closed there is also a circuit established from the line 1 through the line 20, the contacts 112 of the switch 113, line 114, contacts 115 of the switch 116, and contacts 125 of the switch 93, line 126 solenoid 36, line 118, contacts 119, line 120 to the line 2. Energization of the solenoid 36 operates the clutch 42 and causes the rotatable contact member 45 to move from its starting position.

The circuit through the lamp 7 is then completed and the light passes through the negative 5 to the photo cell 8. The circuit of the lamp 7 is from the generator 90, which is driven by the motor 21, through the line 89 to the rheostat contacts 83, line 85 to the annular contact 48, line 49, lamp 7, line 127, contacts 92 of the switch 93 and line 91 to the generator 90.

The resistance of the photo cell 8 to the flow of the current is dependent upon the amount of light that passes through the negative 5 to the photo cell, as in the manner well known in the art. The photo cell 8 is connected to an amplifier tube 128. One side of the amplifier tube is connected by a line 129 to the line 20 and the supply line 1, and the other side of the photo cell 8 is connected by a line 130 to a solenoid 131 which is connected to the other side of the amplifier tube 128. The remaining terminal of the amplifier tube 128 is connected to the line 2 through the line 132. The solenoid 131, when sufficiently energized, operates the switch 116 to open the contacts 115 through which the current flows to the solenoid 36 that operates the clutch 42. When the contacts 115 are open, the clutch 42 is opened and the rotatable contact member 45 ceases to rotate. Hence, the light in the lamp 7 is increased to reduce the resistance of the photo cell to allow sufficient quantity of current through the solenoid 131 to open the switch 116 which opens the clutch 42 and locates the rotatable contact member 45 in a position which is dependent upon the degree of average opacity of the negative 5. As the contact member 45 is rotated, the resistance from the generator 90 is reduced step by step until the intensity of the lamp 7 increases sufficiently to produce the required flow through the photo cell 8 that will cause the operation of the switch 116 and open the contacts 115 and consequently the clutch 42.

As the contact member 45 is rotated, it connects sequentially the contacts 52 to 60 with the annular contact 50 and, as the contacts 52 to 60 are connected, they are located in parallel circuits, that are connected to the line 1 through the lines 51 and 19, the contact 50 and the contacts 72 to 80 sequentially as they make contact with the contacts 52 to 60. The contacts 52 to 60 are connected to the lamps 62 to 70 respectively, but the return of the circuit from the lamps 62 to 70 is through the line 135 which, however, is open at the contacts 136 by reason of the fact that the contact member 45 has left the switch 94. When the contacts 115 are opened by sufficient reduction of the resistance to the flow of the current through the photo cell 8, the circuit through the solenoid 36 is opened as heretofore pointed out, and the contact member 45 ceases to rotate, it, however, having established connection to the printing lamps as determined by the degree of opacity of the negative 5. Also, when the switch 116 is opened, the circuit through the solenoid 29 is opened and the switch 93 is consequently opened. When the switch 93 is open, it opens the circuit of the lamp 7 and completes a circuit through the contacts 140, from the line 1, line 19, line 104, through the lamp 141 to the line 142 and the line 2. The lamp 141, when lighted, signals to the operator that the apparatus has either measured the degree of opacity of the negative 5 or that the photo cell 8 has not been affected as by reason of the high degree of opacity of the negative 5, and is at rest.

In case the photo cell 8 does not respond to the light transmitted through the negative 5, the rotatable contact member will continue to move over the circular contacts until the switch 113 is opened. This opens the circuit through the solenoid 29 which allows the switch 93 to open by the spring 143 and the signal lamp 141 is lighted which indicates that the arm 45 has made a complete rotation.

The negative 5 is then placed in the box or chamber in which the lamps 62 to 70 are located, together with a photo print paper and, preferably, in a chamber that is separated from the light of the lamps by ground glass for printing purposes, in the manner well known in the art. The switch 145 is then closed, whereupon a circuit is established from the line 1 through the line 146 to the solenoid 147 and to the contacts 148 of the switch 149 which, however, is normally open. The gear box 23 has a rotatable arm 150 supported therein and connected to the gear that is rotated by the motor 21 as long as the switch 3 is closed. The arm 150 is so located relative to the switch 149 to cause periodic closing of the switch 149. When the switch 145 is closed, the circuit will be completed for a short period of time from the line 146 through the solenoid 147, the line 151, contacts 148, and line 152, to the line 39 and the line 2. This energizes the solenoid 147 and closes a switch 154. The circuit is then completed through the solenoid 147, line 151, contacts 155, line 156, to the contacts 157 of the switch 158, the line 39 which operates to hold the switch 154 closed until the switch 145 is opened by continued movement of the arm 150. The return of the circuit of the printing lamps 62 to 70 is through the line 135 to the contacts 136 of the switch 154 and to the line 39 and line 2. The circuit through one or more of the lamps, as determined by the location of the contact member 45, is thus completed and the lights will be lighted. The sensitized paper which together with the negative have been placed in printing position, now receives light of required intensity to print the positive within the predetermined period, that is, until the circuit through the solenoid 147 is opened by the switch 158.

The arm 150 is so geared to the motor 21 in the gear box 23 that it makes a half of a rotation within a given time, as, for example, in one second. Consequently, the printing begins when the switch 149 is closed and continues until the time that the switch 158 is opened. The switch 158 is opened by the rotation of the arm 150 and consequently the time of closing the switch 149 to the opening of the switch 158, will depend upon the rate of rotation of the arm 150. When the switch 158 is opened by the arm 150, the circuit through the solenoid 147 is opened which releases the switch 154 and opens the contacts 155 and 160. Opening the contacts 160, opens the return of the lamps 62 to 70 that are connected through the contact member 45 to the source of supply. The print may then be removed from the printing box in which the lamps are located. If desired, a second sheet of sensitized paper and the negative 5 may be placed in printing position in the printing box and the switch 145 again closed, and upon closing the switch 149 by rotation of the arm 150, the switch 154 will be again closed which again completes the circuit through the lamps for a second period and until the switch 158 is again opened. As many prints may be made from the negative by a single setting of the contact member 45, as may be desired. When it is desired to print from another negative, the push rod 12 is again operated and the contact member 45 is moved to its initial position, as described above, and the operation of the system is repeated.

To operate the system, the negative is placed in position between the photo cell 8 and the lamp 7, and the switch 3 is closed. The push rod 12 is then operated to close the switch 15 whereupon the motor 21 is connected by means of the solenoid 36 and the clutch 42 with the rotatable contact member 45 to locate the rotatable contact member 45 in its initial position on the first of the contacts 83 and so as to close the switch 100. The signal lamp 96 is then lighted which indicates that the apparatus is in position to measure the light transmissibility of the negative 5. The push rod 12 is then released which causes the switch 93 to close and complete the circuit through the solenoid 36 which again connects the rotatable contact member 45 with the motor 21 through the gear box 23. The rotatable member 45 moves over the circular contacts 48, 50, 52 to 60, as well as the contacts 83 and until the circuit through the solenoid 29 is opened to open the switch 93, that is, until the switch 116 is opened by the operation of the solenoid 131 which is connected in series with the photo cell 8. The light from the lamp 7 increases in intensity as the resistance of the circuit in which the lamp 7 is located is reduced. The lamp 7 is located in the circuit of the constant current generator 90 and is in series with the rheostat contacts 83 and the resistances 84. As the rotatable contact member 45 is moved by the motor 21, the resistance of the rheostat is reduced. This continues until the light from the lamp 7 increases to a degree of intensity that it will cause the photo cell 8 to be reduced in resistance sufficient to in turn cause the operation of the solenoid 131. This permits the current through the photo cell 8 to increase until it opens the switch 116 and breaks the circuit through the solenoid 29 which causes the switch 93 to open and this in turn opens the circuit of the solenoid 36 which releases the clutch connection between the shaft 22 of the motor 21 and the shaft 44 to which the contact member 45 is connected and the member 45 is stopped.

This locates the contact member 45 in contact relation with certain of the circular contacts that are connected with one or more of the printing lamps 62 to 70. The number of printing lamps that will then be connected in multiple by the rotatable contact member 45, will be dependent upon the degree of opacity of the negative and the light produced by the lamp so connected will produce a light of sufficient intensity to print positives from the negative within a definite period of time, such as one second or two seconds, according to the adjustment of the machine.

The printing of the positive may then be performed by the lights that have been thus connected by the rotatable contact member 45 when the circuit through the lamps is completed. The circuit through the lamps is completed during the operation of the motor 21. A rotatable arm 150 is connected with the motor to produce a complete rotation within the definite period of time, such as two seconds. During each rotation a switch, that operates to complete the circuit of the lamps, is closed and another switch, which operates to open the circuit of the lamps, is opened, and between the opening and closing of the switches, namely, the switches 149 and 158, the printing of each positive is produced. In order to print, the switch 145 is closed which completes the circuit through the solenoid 147 which closes the switch 154, but the circuit through the lamps is not completed until the arm 150 closes the switch 149. The positive and negative having been placed in position in the printing chamber, the light operates through the negative on the positive to print the positive and until the switch 158 is opened, whereupon the circuit through the lamps is broken.

Preferably, the lamps 62 to 70 are arranged to obtain approximate centralization of the light where only one or two of the lamps are used in the printing operation, thus in the diagram, the lamp 62 is located centrally with respect to the lamps 63 and 64 next to be connected in order. Also approximate centralization of the group is maintained by the lamps 65 and 66 which complete the circle around the first lamp to be lighted, and the other lamps 67, 68, 69 and 70 sequentially maintain substantial uniformity of light distribution by their arrangement around the central lamp 62.

I claim:

1. In an apparatus for photo printing positives from negatives, a contact member, an actuating means for operating the contact member, a photo cell, a source of supply of light, the photo cell actuated according to the light transmitted through the negative, a member actuated by the photo cell for controlling the said actuated means, a plurality of printing lamps, means for sequentially connecting the printing lamps with the said contact member, and a source of supply of electricity connected to the contact member.

2. In an apparatus for photo printing positives from negatives, a contact member, an actuating means for operating the contact member, a photo cell, a source of supply of light, the photo cell actuated according to the light transmitted through the negative, a member actuated by the photo cell for controlling the said actuated means, a plurality of printing lamps, means for sequentially connecting the printing lamps with the said contact member, a source of supply of electricity connected to the contact member, and means for controlling the circuit of the printing lamps to close the circuit for a definite period of time.

HENRY V. SPERBECK.